United States Patent Office 3,116,157
Patented Dec. 31, 1963

---

3,116,157
REFRACTORY RAMMING MIX
John C. Burbach, Niagara Falls, N.Y., assignor to Union Carbide Corporation, a corporation of New York
No Drawing. Filed Dec. 23, 1960, Ser. No. 77,824
6 Claims. (Cl. 106—69)

This invention relates to a refractory ramming mix and to a method for the production of solid agglomerates of refractory nonmetallic substances.

Refractory nonmetallic substances are commonly used in contact with molten metals and slags. Many of these substances are not readily obtainable in massive form but rather are obtained as powder which must be compacted and agglomerated into useful shapes. In some instances it is possible to sinter the refractory materials into a coherent mass. With many, however, it is difficult to obtain such a sintered bond. It is common, in such instances, to utilize binding agents for the agglomeration of the refractory materials. Such binding agents are generally susceptible to attack by molten metal or slag, or soften or decompose at a lower temperature than the bonded material and thus decrease the refractoriness of the agglomerate or often introduce foreign material into the melt.

The problems are well illustrated by silicon nitride. This refractory is particularly useful in contact with molten aluminum because it is not readily wet or attacked by the molten metal. However, silicon nitride is usually obtained as a fine powder which is not readily sintered into a coherent mass. Common bonding agent such as sodium silicate are readily attacked by molten aluminum.

It is one object of this invention to provide a novel refractory ramming mix which may be utilized in contact with molten metals and slags.

It is another object to provide a process for the production of solid agglomerates of refractory nonmetallic substances.

Other objects will be apparent from the subsequent disclosure and appended claims.

The refractory ramming mixture which satisfies the objects of the invention comprises 85 to 95 weight percent of refractory nonmetallic substances, and from 5 to 15 weight percent of a solution of siloxane polymers.

The process which satisfies the objects of the present invention comprises forming the aforementioned refractory ramming mixture to a desired shape, heating the formed mixture to volatilize the polymer solvent from the mixture without destruction of the shape, and baking the mixture to effect pyrolysis of the siloxane polymer whereby the organic portions of said polymer are evolved in gaseous form.

The useful refractory substances are those oxides and nitrides which have high temperature stability and are resistant to attack by molten metals and slags. Silicon nitride is particularly desirable in this respect. While both alpha and beta silicon nitrides are useful, the beta form is quite superior because of its superior high temperature properties.

The siloxane polymers may be any of those resulting from the polymerization of the alkyl or aryl siloxanes or the substituted compounds thereof. However, there is a decided advantage in utilizing polymers of alkyl siloxanes wherein the alkyl groups contain less than five carbon atoms, and still more preferable, a maximum of two. Thus, the volume of gas evolved during pyrolysis is determined primarily by the nature of the organic groupings of the siloxane polymers. Examples of suitable polymers are those of the methyl and ethyl siloxanes and aminopropyl siloxane. The molecular weight of the polymer should be at least 1000, and preferably higher, provided substantial solubility in the selected volatile solvent is retained. Good results have been obtained with polymers having molecular weights in the range of about 5000 to 6000. A firmly bonded product may be obtained with polymers of 10,000 molecular weight.

The solvents should be readily volatilized and be capable of dissolving substantial quantities of the siloxane polymer. The higher the concentration of polymer in the solvent, the less solution need be used with a reduction in the amount of volatiles to be removed from the shaped refractory. Examples of suitable solvents are alcohol, toluene, xylene, isopropyl ether, and methyl-ethyl ketone.

After incorporating and mixing the polymer solution with the powdered refractory it may be molded into desired shape by any suitable means such as pressing and ramming. After forming, the compacted mass is baked to drive off the vehicle and to decompose and volatilize the organics and ultimately to oxidize the inorganic residue to silica which subsequently bonds the refractory particles. Further heat-treatments to densify the shape may be applied but it is not necessary. In applying heat, care must be exercised to prevent too rapid gas evolution which would have a tendency to rupture the shape or body of refractory. Heating to approximately 1100° C. has been found adequate to pyrolyze the resin and produce a good silica bond.

In an example of the invention, 3332.5 grams of silicon nitride (150 mesh and down) were mixed with 45.6 grams of a 10 percent solution of polydimethylsiloxane dissolved in a toluene-alcohol mixture. The general formula of the polymer is

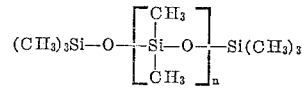

wherein $n$ is such a number as to provide a total molecular weight of the order of 5000+. The mix was rammed into a crucible form by hand, giving a crucible 2½ inches high by 2¾ inches in diameter with a well 1½ inches in diameter by 1½ inches deep. After air drying for ½ hour, the crucible was ignited to burn off the remaining solvent and to partially pyrolyze the resin. Further firing at 1100° C. in a gas-fired furnace produced a bonded $Si_3N_4$.

In another example of the invention, 350 grams of 150 mesh silicon nitride, $Si_3N_4$, were mixed with 40 grams of a 10 percent solution of γ-aminopropyl silicone polymer dissolved in alcohol. The mix was rammed into a crucible shape, the solvent was burned off, and the crucible was partially cured, over a gas flame. Further firing at 1100° C. yield a very strong bond.

The foregoing examples were repeated except that the mix contained 90 percent silicon nitride and final firing was at 1200° C. Strongly bonded crucible and cylinders were produced.

To illustrate the advantage of the present invention, a fired product similar to that of the first example was filled with aluminum pillows and placed in an electric muffle furnace for 15 days at 950° C. After 6 days, slight attack was noted at the dross line at the top of the crucible. After 15 days, the black reaction product had penetrated the upper rim of the crucible but had not badly affected the crucible below the metal. In comparison, crucibles bonded with sodium silicate were penetrated in only 8 days by molten aluminum at 900° C.

What is claimed is:

1. A novel refractory ramming mixture comprising 85 to 95 weight percent of silicon nitride and 5 to 15 weight percent of a solution of at least one siloxane polymer having a molecular weight of at least 1000.

2. A novel mixture in accordance with claim 1 wherein the organic portions of the siloxane polymer is an alkyl group with a maximum of 5 carbon atoms.

3. A composition in accordance with claim 2 wherein said siloxane polymer is polydimethylsiloxane.

4. A composition in accordance with claim 2 wherein said siloxane polymer is polydiethylsiloxane.

5. A composition in accordance with claim 2 wherein said siloxane polymer is polyaminopropylsiloxane.

6. A process for the production of solid agglomerates of silicon nitride which comprises providing a mixture comprising 85 to 95 weight percent of silicon nitride and 5 to 15 weight percent of a solution of at least one siloxane polymer having a molecular weight of at least 1000, forming said mixture and drying the resulting shape without destruction of said shape, and baking the shape to effect pyrolysis of the siloxane polymer whereby the organic portions of said polymer are evolved in gaseous form to leave a silica-bonded refractory agglomerate.

References Cited in the file of this patent

UNITED STATES PATENTS 2,641,044 Bearer _____ June 9, 1953